United States Patent [19]
McIntyre et al.

[11] Patent Number: 4,483,177
[45] Date of Patent: Nov. 20, 1984

[54] TRANSDUCER CALIBRATION VERIFICATION FIXTURE FOR MULTIPLE SPINDLE TORQUE UNITS

[75] Inventors: Roger L. McIntyre, Greenhurst; Robert H. Reed, Lakewood, both of N.Y.

[73] Assignee: Cummins Engine Company, Inc., Columbus, Ind.

[21] Appl. No.: 456,249

[22] Filed: Jan. 6, 1983

[51] Int. Cl.³ ............................................. G01L 25/00
[52] U.S. Cl. .................................... 73/1 C; 73/862.08
[58] Field of Search ............................. 73/1 C, 862.08

[56] References Cited

U.S. PATENT DOCUMENTS

| | | | |
|---|---|---|---|
| 3,115,029 | 12/1963 | Better | 73/1 C |
| 3,382,710 | 5/1968 | Aubeges et al. | 73/862.12 |
| 3,457,780 | 7/1969 | Agostini | 73/862.08 |
| 3,740,999 | 6/1973 | Whitehouse | 73/862.08 X |
| 3,797,305 | 3/1974 | Haskell . | |
| 4,253,325 | 3/1981 | Reed et al. | 73/1 C |

FOREIGN PATENT DOCUMENTS 1551854  1/1969  France ............................. 73/862.08

Primary Examiner—Charles A. Ruehl
Attorney, Agent, or Firm—Sixbey, Friedman & Leedom

[57] ABSTRACT

A transducer calibrating and testing assembly is provided for calibrating the spindle transducers in a multiple spindle machine tool without the need for completely dismantling the machine to perform the calibration operation. The transducer calibrating and testing assembly includes support housing means, and torque applying means, including a test bolt and nut, for applying a known torque to the spindle as measured by a master transducer. The torque applying means is supported by and contained substantially entirely within the support housing means. Torque releaser means for manually or automatically releasing the torque applied by the torque applying means to enable the serial performance of several calibration tests is also provided. The support housing means of the present testing assembly engages the stationary housing portion of the machine spindle, and the torque applying means is driven by the machine spindle drive to apply and maintain the desired torque, which is measured by a master transducer and indicated on a readout display. A separate readout display permits comparison of the torque output of the spindle torque transducers with that of the master transducer so that the accuracy of the spindle transducer can be ascertained.

16 Claims, 4 Drawing Figures

TRANSDUCER CALIBRATION VERIFICATION FIXTURE FOR MULTIPLE SPINDLE TORQUE UNITS

TECHNICAL FIELD

The present invention relates to the calibration of torque measuring transducers and, specifically, to an apparatus and method which are particularly suited for calibrating the spindle torque transducers in a multiple spindle machine tool designed to apply a wide range of torques.

BACKGROUND ART

The high speed assembly lines found in modern manufacturing facilities are typically equipped with assembly machines designed to run down and tighten automatically a plurality of threaded fasteners to a predetermined torque value. These machines, known as multiple spindle torque units, are essential components of engine assembly lines which must operate at a moderate to high rate of speed in applying and tightly securing large numbers of threaded fasteners. The amount of tightness or torque placed on each fastener is controlled by an electronic device known as a torque transducer which is an integral component of each spindle.

A torque measuring transducer, such as a spindle mounted strain gauge, tends over time to give false readings due to drift in the measuring circuit to which the transducer is attached. Inaccurate readings may also result from deterioration of the bonding between the transducer and its support and/or non-resilient deformation of the spindle due to stress cycling and the like. Periodic checking and calibration is, therefore, a prerequisite for reliable transducer operation. Each spindle must be checked from time to time to test and verify that the correct amount of torque is being applied to each threaded fastener. Since the spindle torque measurements are used to control the machine tool and to check proper operation, periodic calibration of the torque measuring transducer mounted on the spindle of the machine tool is vitally important to insure that the machine tool will function properly and with precision.

Calibration of a spindle mounted torque transducer typically involves the steps of applying a known torque to the spindle and adjusting the measuring circuitry and/or transducer to produce an output reading corresponding to the known torque. Obviously, the accuracy of this method of calibration will depend, in large part, on the degree to which the applied torque can be accurately determined and controlled.

The apparatus and methods currently available for the testing and verification of the calibration accuracy of the torque transducers associated with each spindle of a multiple spindle torque unit, while effective for the desired purpose, are nonetheless, subject to limitations. One way to assure that a known torque is accurately applied to each spindle is to test each spindle at a bench testing unit remote from the machine tool in which the spindle is normally mounted. This involves at least partially disassembling the machine tool so that each spindle can be removed for testing and then reinstalling each spindle following calibration. Although very accurate calibration of the spindle transducers is possible with this method, the likelihood of transducer damage between calibration and spindle reinstallation which would disturb the calibration must be considered. Bumping or jarring the spindle could occur with sufficient force during reassembly of the machine tool to cause the torque transducer to be miscalibrated. Such an inaccuracy is not likely to be noticed even after the machine tool is put back in operation. When the inaccuracy is ultimately detected, the machine tool will have to be dismantled again and the transducer recalibrated and reinstalled. The bench testing method just described can also be quite costly. The machine tool is likely to be out of service for several days, requiring either that the assembly line be shut down or that an alternative torquing method be employed while the spindle transducers are being tested and calibrated.

A method and apparatus for calibrating a torque measuring transducer mounted on the spindle of a machine tool while the spindle remains mounted within the machine tool is disclosed in U.S. Pat. No. 4,253,325, assigned to the same assignee as the present invention. In the method disclosed therein, the spindle motor is pinned to restrict rotation during the calibration procedure so that the required circular motion is generated against the pinned motor and spindle transducer. A torque applying lever assembly is mounted between and supported by two adjacent spindles, on one of which is mounted the transducer to be tested. A first arm of the torque applying lever assembly is mounted by a torque coupling assembly to the spindle on which the transducer being calibrated is mounted, and a second arm in the form of a threaded shaft pivotally connected at one end to the first arm is threadedly mounted by a support coupling to an adjacent spindle. A master transducer is mounted with the torque coupling assembly on the spindle to be tested so that a known torque can be applied to the spindle by the torque applying lever assembly and the spindle transducer output compared with the master transducer output and appropriately calibrated. The apparatus and method disclosed in U.S. Pat. No. 4,253,325 has proved to be effective for the on line calibration of spindle transducers in machine tools which apply torques in the lower ranges. However, in machine tools operating above the 100 foot pound range, the system becomes distorted, with distortions of up to 20% being noted. Consequently, this system should be limited for use with smaller torque units that operate well below 100 foot pounds so that the accuracy of transducer calibration can be positively assured. In addition, this system must be mounted on two adjacent spindles for operation and, therefore, must be properly positioned on both spindles prior to the application of the known torque to the spindle to be tested to insure that the known torque will be accurately applied by the assembly and will be safely maintained for as long as required for calibration.

Other apparatus and methods for determining the torque output of a spindle or rotating shaft are disclosed in U.S. Pat. Nos. 3,115,029 to Better; 3,382,710 to Aubeges et al; 3,457,780 to Agostini and 3,797,305 to Haskell. While the devices disclosed in the aforementioned patents may function effectively to measure the torque of these various types of spindles or rotating shafts, none of these references discloses a means for applying a known torque, as measured by a master transducer, to calibrate a torque transducer mounted on the machine spindle.

DISCLOSURE OF THE INVENTION

It is the purpose of this invention to provide a practical method and apparatus for calibrating a torque transducer without the drawbacks of the prior art as discussed above.

A specific object of the invention is to provide apparatus for calibrating a torque transducer mounted on a spindle of a machine tool while the spindle remains mounted within the machine tool.

Yet another object of this invention is to provide apparatus for calibrating a torque transducer mounted on a spindle of a multiple spindle machine tool wherein a known torque is applied to the spindle on which the torque transducer is mounted by calibrating apparatus which is quickly and easily locked on and removed from the spindle housing without dismantling the machine tool or disturbing the pre-existing pattern in which the spindles are set up to carry out a specific machining step.

A further object of the present invention is to provide apparatus for performing multiple calibration tests on the same spindle transducer without the need for removing the calibration apparatus from the spindle before beginning a new test.

An additional object of the present invention is to provide a torque testing assembly which may be employed to calibrate safely and accurately large torques, including those in excess of 100 foot pounds.

In accordance with the present invention an apparatus and method for calibrating a transducer on a spindle is provided comprising a testing assembly including torque applying means supported by and contained substantially entirely within support housing means which removably engages the housing of the spindle having the torque transducers to be calibrated whereby a known torque is applied to the spindle. This apparatus possesses the advantages of attaching easily to the spindle having the transducer to be calibrated requiring no dismantling of the machine tool for its installation and operation, functioning accurately over a wide range of torques, and permitting calibration tests to be performed repeatedly without the removal of the testing assembly from the spindle.

The testing assembly of the present invention is slipped on the machine spindle housing, and the spindle motor is employed to apply a known torque, as measured by a master transducer in the testing assembly, to a test bolt and nut positioned within the testing assembly. The torque output of the spindle transducer is then compared with the torque output of the master transducer and the spindle transducer adjusted as required. The testing assembly further includes torque release means integral with the test bolt which allows the test bolt and nut to be loosened while the testing assembly remains mounted on the spindle, thereby permitting the repeated application of the desired torque to the test bolt and nut.

Other objects and advantages will be apparent by consideration of the following description, claims and drawings.

BRIEF DESCRIPTION OF THE DRAWINGS

The details of our invention will be described in connection with the accompanying drawings, in which.

BEST MODE FOR CARRYING OUT THE INVENTION

Figure 1:
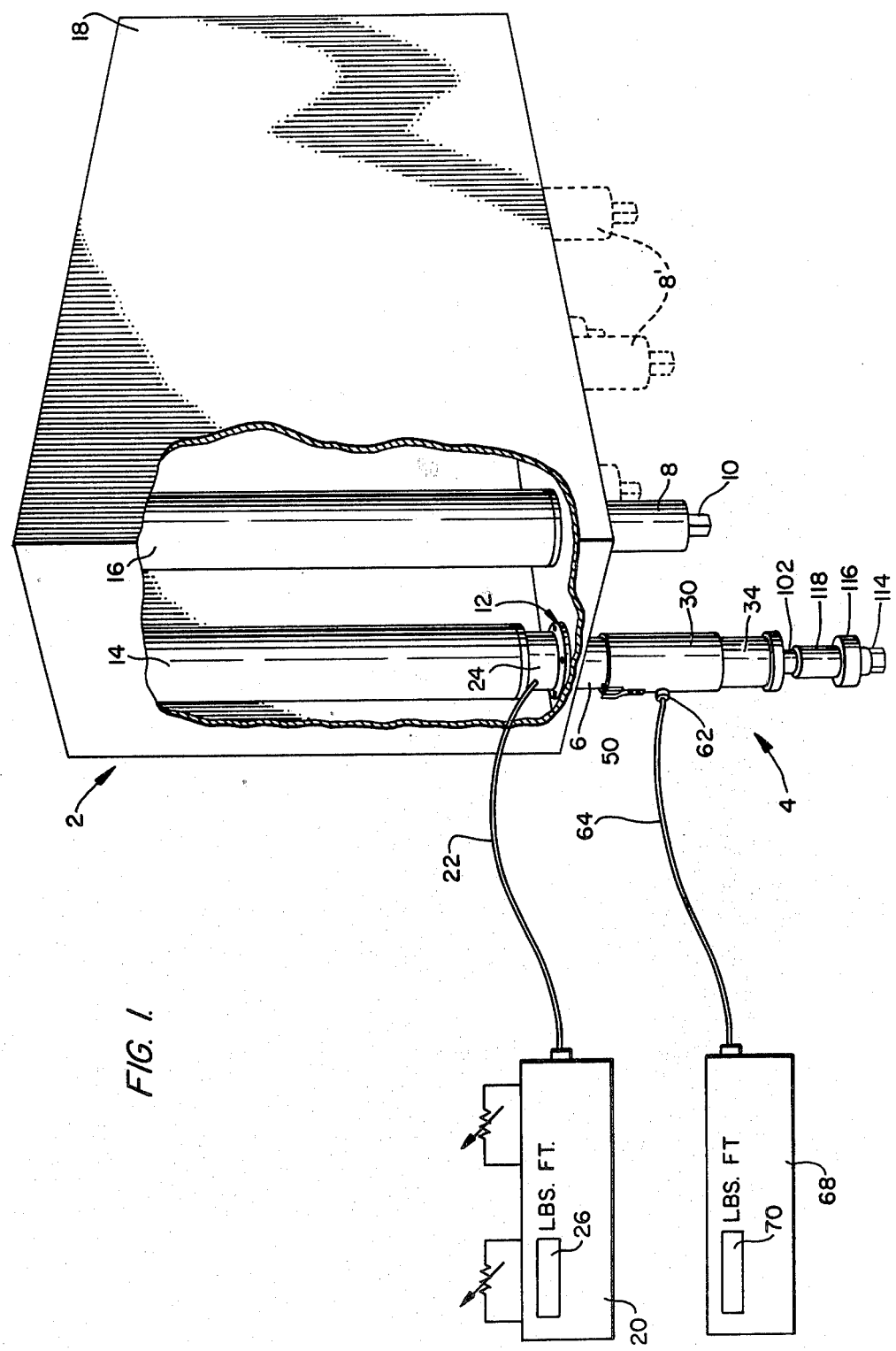
FIG. 1 is a partially cut away perspective of a multiple spindle machine tool showing the transducer calibrating assembly of the present invention attached to a spindle.

Referring to the drawings, FIG. 1 illustrates a multiple spindle machine tool 2 showing the transducer calibrating assembly 4 of the present invention, the operation of which will be described hereinbelow. To understand the subject invention, it should be noted that machine tool 2 is illustrated in a highly simplified form which includes only those portions of the machine tool which are involved in the operation of the subject calibrating assembly 4. In particular, machine tool 2 is of the type which includes a plurality of spindles such as spindles 6 and 8 mounted on a machine frame (not illustrated) in a manner permitting the spindles to be repositioned relative to one another. A typical multiple spindle machine tool may have 12 or more such spindles as are schematically illustrated by dashed lines 8' in FIG. 1. As manufacturing requirements change, the spindles are repositioned relative to one another in accordance with a desired pattern of machine operation. For example, each spindle may be coupled by means of drive couplings, such as drive coupling 10 shown on spindle 8, to a bolt engaging socket (not illustrated) for tightening bolts or capscrews to a prescribed torque value. To permit the same multiple spindle machine tool to operate on a different workpiece having a wide variety of shapes and sizes, each spindle is mounted for rotation in a journal 12 which may be repositioned and affixed to the machine frame as desired. Each spindle includes its own motor, such as motors 14 and 16 connected with spindles 6 and 8, respectively. Surrounding all of the motors and corresponding journals for the spindles is a removable housing 18. Although not illustrated, housing 18 may include one or more removable panels designed to provide easy access to the spindle drive motors without necessitating the removal of the entire housing 18 as would normally be required in order to remove each spindle from the machine tool when employing a conventional bench test unit.

A torque transducer, not illustrated, is mounted on each spindle to measure the amount of torque supplied to the drive coupling of that spindle by the corresponding motor. Electrical measuring circuitry 20 is connected to each spindle mounted torque transducer by an electrical lead 22 and an electrical connector (not illustrated) extending between the stationary outer housing 24 of journal 12 and the spindle on which the transducer is mounted. To provide an operator with instantaneous torque readings for each spindle, measuring circuitry 20 may include a readout display 26 capable of providing a visible indication of the torque being supplied to the drive coupling of a particular assembly.

Figure 2:
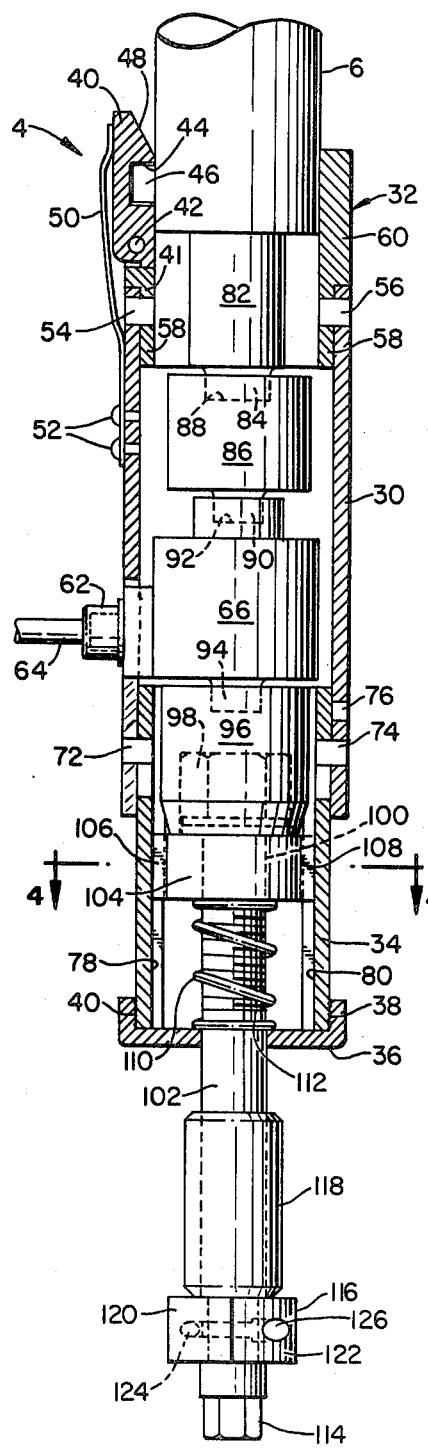
FIG. 2 is a cross sectional view of the transducer calibrating assembly of the present invention.

The calibrating or testing assembly 4 which is the subject of this invention is a simple unitary device which is very easily and quickly locked on the spindle for performance of the transducer calibration; removed from the spindle following calibration and transferred to the next spindle having a transducer to be calibrated. FIG. 2 illustrates the present testing assembly in cross-section. The testing assembly shown therein includes three primary components: support housing means for removably mounting the testing assembly 4 on a spindle 6; torque applying means supported within the support housing means for applying a known torque to the spindle; and torque releaser means integral with the torque applying means for releasing the applied torque.

The support housing means includes a central housing section 30 to which is secured at the end which extends toward spindle 6 an upper housing section 32. At the end of central housing section 30 which extends away from spindle 6 is mounted a lower housing section 34, which may be removably mounted on central housing 30 in a manner which will be explained more fully hereinbelow. A cup-shaped housing having an interior threaded portion 38 is engaged by corresponding threads 40 on the exterior of lower housing section 34.

Upper housing section 32 of the testing assembly is designed to lock on and engage the stationary outer housing of the spindle 6 while calibration of the transducer is being carried out. The present invention provides apparatus whereby the testing assembly may be quickly and securely anchored to the spindle prior to testing and easily removed for transfer to another spindle when the testing is complete. This is achieved by providing a retainer clip 40 which is pivotally mounted on a portion 41 of the upper housing 32 by a pivotal connector such as dowel pin 42. Retainer clip 40 includes a socket 44 which is shaped to receive head 46 of the capscrew (not illustrated) which is normally positioned in the stationary housing portion of the spindle. The end of the retainer clip 40 which is not pivoted to the upper housing includes chamfered edge 48 which allows the housing to be gripped at that point for easy removal from the spindle. The retainer clip 40 is biased toward the spindle and maintained in engagement therewith by a spring 50 which may be in the form of a leaf spring as shown in FIG. 2. If a leaf spring is used for this purpose, it should extend from a point substantially below the upper housing portion 41 which supports the retainer clip 40 to insure that sufficient force to maintain the testing assembly in engagement with the spindle is exerted by the spring. In the preferred embodiment shown in FIG. 2, leaf spring 50 is mounted on the central housing 30 by a pair of spaced capscrews 52.

The upper housing 32 could be configured in forms other than that shown in FIG. 2 to achieve the purpose of securing the testing assembly of the present invention on a spindle to calibrate the spindle transducer. For example, a spring loaded collar (not illustrated) employing a plurality of equally spaced springs could be employed effectively, especially on spindles having no structure like projecting head 46 on the spindle housing to engage a socket in a retainer clip like clip 40. Occasionally either the projecting capscrew head 46 breaks off or a spindle is not provided with a capscrew head projecting from the housing, in which cases the spring loaded collar arrangement is preferable to the retainer clip for securing the testing assembly to the spindle housing and maintaining the assembly in place on the spindle during testing.

The upper housing section 32 and the central housing section 30 are preferably joined together as shown in FIG. 2 by removable dowel pins 54 and 56. Upper housing section 32 includes a bottom portion 58 having a smaller radial thickness than the remaining portion of the upper housing which telescopes into central housing portion 30 so that the connection between these two housing sections resembles a mortise and tenon joint and the radial thickness of central housing 30 and bottom portion 58 is equal to the radial thickness of the upper portion 60 of the upper housing section to impart a smooth outer surface to this part of the testing assembly. Dowel pins 54 and 56 extend through the central housing section and bottom portion 58 of the upper housing section.

The central housing section 30 extends toward and telescopingly receives the lower housing section 34. A transducer connector 62 and electrical lead 64 provide a connection between a master transducer 66 positioned within the central housing section and electrical measuring circuitry 68 which may include a readout display 70 capable of providing a visible indication of the torque output of the master transducer. It is preferred to fasten the lower housing section 34 to the central housing section 30 in a manner which maintains them securely in engagement during testing, but which permits the ready removal of bottom housing section 34 for access to the structures mounted inside. This objective can be achieved by providing removable dowel pins, such as pins 72 and 74, which extend completely through both housing sections and a set screw 76, which extends through the central housing to engage the bottom housing section as shown in FIG. 2. Providing an easily removable bottom housing section permits ready access to the structures inside the housing for adjustment, replacement and the like.

The bottom housing section 34 includes in the interior thereof at least two spaced longitudinal channels 78 and 80 for engaging and holding a test nut against radial movement in a manner which will be explained hereinbelow. A threaded housing cap 36 which engages corresponding threads on the bottom housing section completes the housing portion of the present testing assembly.

The housing of the present testing assembly must securely engage the spindle housing to support the torque testing structure inside the housing and to prevent rotation of this structure when necessary. The torque testing structure inside the housing however, must engage and be driven by the spindle having the transducer to be calibrated. From the spindle housing 6 of the machine tool projects a rotating spindle 82 having a drive coupling 84. The spindle drive coupling 84 must be connected to a master torque transducer 66 so that a known torque can be applied to the spindle. Most spindle drive couplings have about a one inch square drive and most transducer sockets are about $\frac{3}{4}$ inch square. Consequently, one or more adapters such as adapter 86 shown in FIG. 2, are required to provide a driving connection between the spindle and the master transducer. The adapter 86 includes a socket 88 large enough to receive the spindle drive coupling 84 and a drive coupling 90 small enough to engage the socket 92 of a master transducer 66. The master transducer is provided with a drive coupling 94 which drives a test bolt socket 96. The test bolt socket 96 receives master transducer drive coupling 94 in one end. The opposite end of the test bolt socket 96 is shaped to engage the head 98 of a test bolt 100. The heads of most bolts commonly employed as test bolts are typically hexagonal in shape, but other shapes may be encountered, so the use of sockets having configurations which would support these other shapes is contemplated to be within the scope of the present invention.

Figure 3:
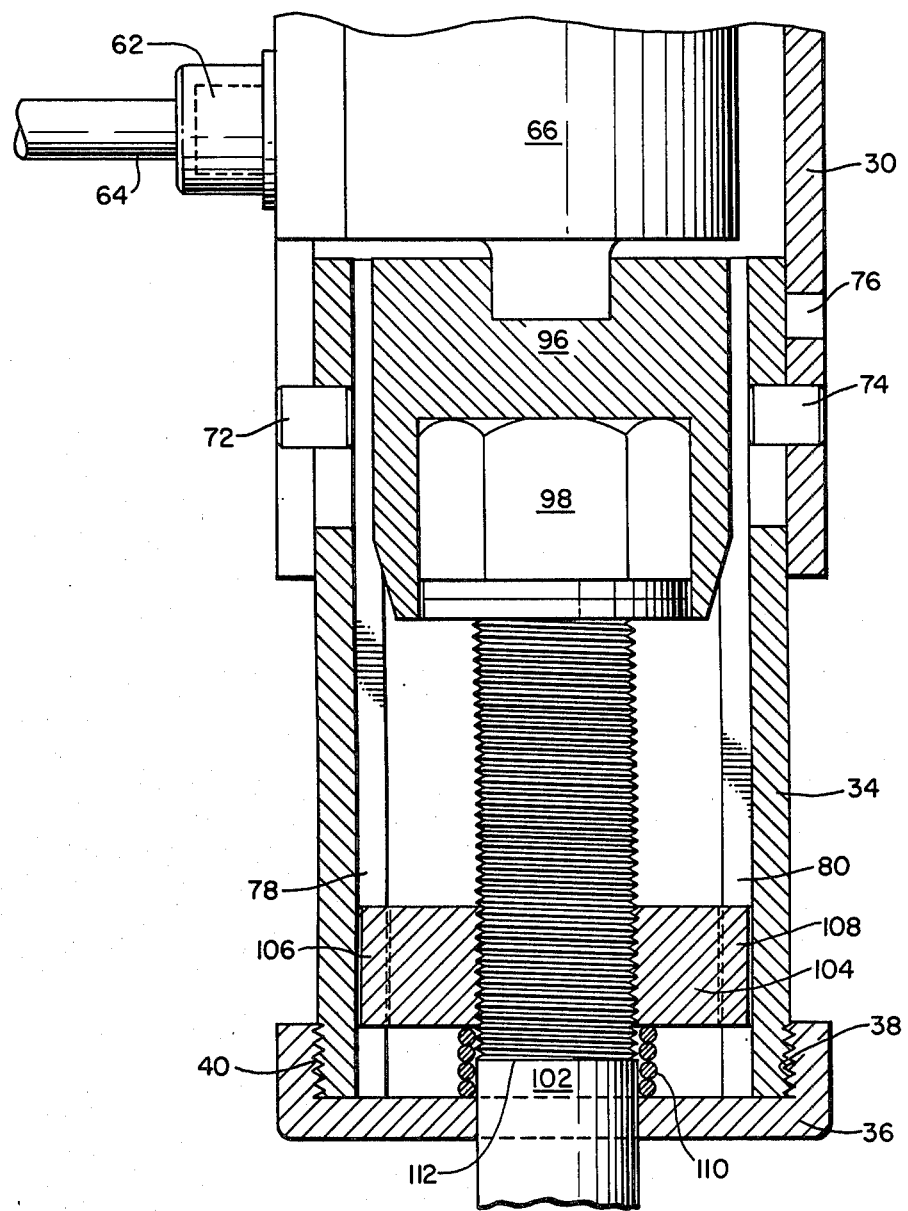
FIG. 3 is an enlarged partial cross section of the test bolt and nut shown in FIG. 2.

In addition to the head portion, test bolt 100 includes a stem portion 102 which extends through housing cap 36 and a substantial distance beyond the lower housing section. A test nut 104 is threadedly engaged by the stem 102 of the test bolt. The test nut 104 includes, in addition, a pair of spaced projections 106 and 108 which are engaged by interior longitudinal grooves 78 and 80 in the bottom housing section. One possible configuration for the test nut 104 is shown in FIG. 3. A spring, such as coil spring 110, is positioned around the shaft 102 of test bolt 100 between the test nut 104 and the housing cap 36. This spring must be sufficiently strong enough to hold the head 98 of the test bolt 100 in socket 96 while the testing assembly is being positioned on the spindle, during intervals between repeated calibration tests and while the assembly is being removed from the spindle.

The shaft 102 of test bolt 100 includes threaded and unthreaded portions. The portion of the shaft 102 which remains completely inside the bottom housing section 30 is threaded between the test bolt head 98 and point 112. This threaded portion should be long enough to provide at least 10 to 15 full threads of free run before the test nut begins to be tightened on the test bolt. The remainder of the bolt shaft is unthreaded.

The spindles on many multiple torque units can be driven in only one direction. Other units permit the spindles to be driven in both a forward and a reverse direction. On the units having the reversing feature, serially performing several calibration tests in the manner which will be described below can be done quite simply without removing the testing assembly from the spindle. The present testing assembly includes features which permit the reversing function to be carried out manually so that removal of the unit from the spindle is not required between tests. The shaft 102 which extends beyond the testing assembly housing has a terminus 114 having a hexagonal or other common configuration which will be accepted by a manual or automatic socket wrench or the like. Spaced away from terminus 114 and toward the assembly unit housing along shaft 102 is a toroidal collar 116. Shaft 102 is preferably narrowed to a slightly smaller diameter under collar 116 than the diameter of the remainder of the shaft so that the collar fits securely on the shaft to prevent a handle 118 from sliding off the shaft. The collar 116 shown in FIG. 2 is formed from two generally seimcylindrical pieces 120 and 122 held together by set screws 124 and 126. Other, equivalent, collar configurations are also contemplated to be within the scope of the present invention. Handle 118, which preferably includes a knurled outer surface (not illustrated) spins freely on shaft 102.

FIG. 3 illustrates a slightly enlarged view of the test bolt 100 and nut 104 in the bottom housing section of the present testing assembly. The preferred extent of the threaded portion 128 of test bolt shaft 102 is clearly shown in this view. The test nut 104 is shown as it would appear prior to the tightening required for a calibration test.

Figure 4:
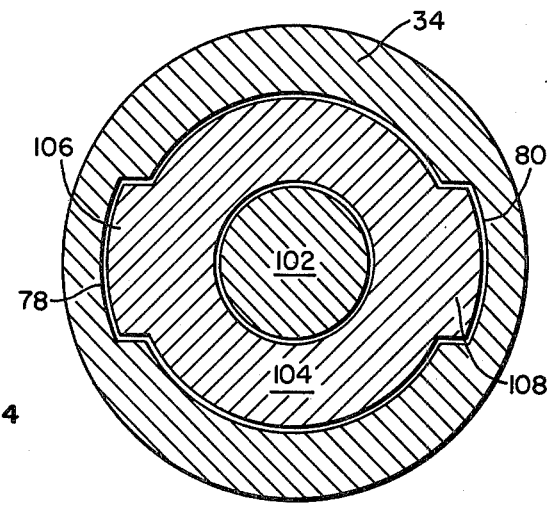
FIG. 4 is a cross sectional view taken along lines 4—4 of FIG. 2.

FIG. 4 illustrates, in cross section, a preferred configuration of test nut 104 with spaced projections 106 and 108 engaging longitudinal channels 78 and 80 in the housing section 34.

Operation of the present testing assembly to calibrate a spindle torque transducer is simple and straightforward. The assembly is slipped on the spindle having the transducer to be tested so that the retainer clip 40 firmly engages the spindle housing capscrew head projection 46. Lead 22 is connected at one end to the spindle torque transducer (not illustrated) and at the other end to measuring circuitry 20 and lead 64 is checked for the proper connection between the master transducer 66 and measuring circuitry 68. The test bolt, at this point is approximately in the position shown in FIG. 3. The spindle motor is activated to drive the spindle and, therefore, impart rotary motion to the test bolt socket 96. The test bolt 100 has about 10 to 15 threads of free run before the test nut 104 reaches the tightening stage. The free running time thus provided allows the motor to reach full speed and momentum and, therefore, simulates actual operating conditions. The test bolt and nut are tightened to the desired torque, as measured by the master transducer 66, which is read on readout display 70. The torque value appearing in readout display 70 is compared with the torque value appearing in readout display 26, which is the torque output of the built-in spindle transducer. If these displays match, the spindle transducer can be assumed to be calibrated correctly. If the displays do not match appropriate adjustments can then be made. The present testing assembly allows the calibration test to be made at the end of a cycle or at peak output torque and, moreover, tests the machine tool under actual operating conditions.

With the testing assembly of the present invention, repeated calibration tests can be performed quickly without removing the testing assembly from the spindle. If the machine tool is equipped with a reversing feature, all that is required to move the test nut and bolt to the "start" position shown in FIG. 3 is to reverse the motor. The nut and bolt can then again be tightened to the desired torque and another calibration reading made. This process can be repeated as often as desired.

Not all multiple spindle machine tools are equipped with the reversing feature described. For machines without the reversing feature the extended portion of the test bolt shaft 102 and the structures associated with it provide a manual means for moving the test nut and bolt to the start position. An automated or a manual wrench or the like which fits the hexagonal terminus 114 of the bolt shaft is engaged thereon, and the testing assembly operator grasps the handle with one hand and moves the wrench with the other hand to loosen the test nut and bolt. Once the test nut and bolt have been manually moved to the starting position, another calibration test can be performed. When the desired number of readings have been made, the testing assembly is moved to another spindle for calibration of that spindle's torque transducer.

It may also be desired during testing of the spindles to perform diagnostic testing on the motor by simulating different degrees of joint hardness. This may be easily accomplished by removing the lower housing section 34 to obtain access to the test nut and bolt and removing the collar 116, the handle 118 and the test nut 104 from the shaft 102 of the test bolt. Concave or convex washers or the like (not illustrated) can then be positioned between the head 98 of the test bolt and test nut 104 in various combinations or configurations to simulate different degrees of joint headness. The bolt shaft structures and bottom housing section must be reassembled, of course, prior to the actual testing.

INDUSTRIAL APPLICABILITY

The transducer calibrating assembly of the present invention is useful in calibrating the spindle transducers in a wide variety of multiple spindle machine tools and offers advantages not heretofore available from existing calibration equipment. The present testing assembly is small enough to be conveniently moved from spindle to spindle and is quickly and easily installed on the spindle to be calibrated. Operation of the assembly requires neither costly and time consuming dismantling of the machine tool nor removal of the spindles. Moreover, the serial repetition of a number of calibration tests may be carried out rapidly and accurately on a single spindle transducer without removing the present testing assembly from the spindle.

We claim:

1. Apparatus for calibrating a torque measuring transducer mounted on a transducer supporting spindle within a machine tool having a plurality of spindles, said apparatus comprising:
    (a) support housing means for removably engaging the stationary portion of one of said spindles;
    (b) torque applying means for applying a known torque to said spindle, said torque applying means being supported substantially completely within said support housing means and including a master transducer means for measuring the actual amount of torque being applied to said spindle; and
    (c) torque releaser means which may be activated manually or automatically to release the torque applied by said torque applying means.

2. Apparatus as described in claim 1, wherein said support housing means includes a central housing section having a first end extending toward said spindle to telescopingly engage an upper housing section and a second end extending away from said spindle to be telescopingly engaged by a lower housing section, wherein said upper housing section includes spindle retainer means for removably securing said support housing means on the stationary portion of said spindle.

3. Apparatus as described in claim 2, wherein said spindle has associated therewith a capscrew having a projecting head and said spindle retainer means includes a retainer clip including a socket shaped to engage the projecting head of the capscrew, and said spindle retainer means further includes spring means for biasing said retainer clip into engagement with said spindle and for securely maintaining said spindle retainer means in engagement with said spindle during calibration of the torque measuring transducer.

4. Apparatus as described in claim 3, wherein said lower housing section is removably telescoped into said central housing section in a manner to permit the ready separation of said lower housing section from said central housing section to provide access to the torque applying means supported within said support housing means.

5. Apparatus as described in claim 4, wherein the end of said lower housing section extending away from said central housing section includes a threaded portion for engaging a correspondingly threaded lower housing cup.

6. Apparatus as described in claim 3, wherein said spring means comprises a leaf spring having a first end which contacts said retainer clip and a second end which is secured to said central housing section.

7. Apparatus as described in claim 3, wherein said torque applying means includes spindle drive adapter means, master transducer means, socket means, a test bolt and a test nut; said spindle drive adapter means engaging said master transducer means, and said master transducer means engaging said socket means in a manner to provide a driving connection between said spindle and said socket means, said test bolt being received by said socket means and having threadedly engaged thereon said test nut, wherein said known torque is applied by said spindle to tighten said test bolt and said test nut.

8. Apparatus as described in claim 7, wherein said spindle drive adapter means and said master transducer are substantially completely contained within said central housing section, and said socket means, part of said test bolt and said test nut are substantially completely contained within said lower housing section.

9. Apparatus as described in claim 8, wherein said test bolt has a head portion, a shaft portion and a terminal end portion and said head portion is received by said socket means and said shaft portion includes a threaded section and an unthreaded section, said threaded section extending from said head portion toward said terminal end portion to terminate just inside said lower housing portion when the head of said test bolt is engaged in said socket means with said unthreaded section extending along the remainder of said shaft to said terminal end.

10. Apparatus as described in claim 9, wherein said torque releaser means includes shaft means coextensive with said test bolt shaft, handle means positioned on said shaft means, collar means for positioning and maintaining said handle means on said shaft means, and socket engaging means for engagement with the socket of a manual or automatic wrench.

11. Apparatus as described in claim 10, wherein spring means is positioned around the threaded portion of said test bolt shaft between said lower housing section and said test nut to bias the head of said test bolt against said socket means.

12. Apparatus as described in claim 11, wherein said lower housing section includes a pair of opposed longitudinal channels extending along substantially the entire axial length of said lower housing section.

13. Apparatus as described in claim 12, wherein said test nut includes a pair of opposed projections shaped to engage said opposed longitudinal channels in said lower housing section so that said test nut can move only in an axial direction in relation to said test bolt shaft and is prevented from moving in a radial direction.

14. Apparatus for calibrating a torque measuring transducer mounted on a transducer supporting spindle within a machine tool having a plurality of spindles, said apparatus comprising:
    (a) a support housing mounted on a nonrotable portion of said transducer supporting spindle and having a central section with one end which telescopingly engages an upper section and another end which telescopingly receives a removable lower section, the upper section of said support housing including spindle housing retainer means for locking the support housing on the spindle;
    (b) a test bolt having threaded thereon a test nut, said test nut being held against radial movement in the lower section of the support housing while allowed to move axially;
    (c) a socket shaped on one end to receive said test bolt and shaped on the other end to engage the drive of a master transducer, the master transducer being in turn engaged by a spindle drive adapter mounted on the spindle, thereby providing a driving connection between said spindle and said test bolt to tighten said test bolt to a predetermined torque value, said torque value being measured by said master transducer.

15. A method of calibrating the spindle mounted torque transducers on a multiple spindle machine tool, comprising the steps of:

(a) engaging the upper housing of a torque testing unit on the stationary housing portion of the spindle to be tested;

(b) connecting the transducer to be tested and a master transducer in the torque testing unit to separate readout display units;

(c) activating the spindle motor to tighten a free running test bolt against a captured nut positioned in the torque testing unit until the master transducer readout display indicates that a preselected torque value has been reached.

(d) comparing the master transducer readout display with the machine spindle transducer readout display;

(e) adjusting the machine spindle transducer as required to calibrate the machine spindle transducer;

(f) releasing the torque applied to the test nut and bolt;

(g) repeating steps (c) through (f) as many times as are required to obtain a desired number of torque calibration readings;

(h) removing the torque testing unit from the spindle having the calibrated transducer; and (i) engaging the torque testing unit on the next spindle having a transducer to be calibrated.

16. A method as described in claim 15, further including the step of inserting one or more washers along the shaft of the test bolt between the head of the test bolt and the test nut, the number and configuration of said washers being selected to simultate the hardness of different types of joints.

* * * * *